United States Patent [19]

McManis, III et al.

[11] Patent Number: 4,528,253

[45] Date of Patent: Jul. 9, 1985

[54] HIGH PERFORMANCE MOLTEN NITRATE CELL

[75] Inventors: George E. McManis, III; Melvin H. Miles; Aaron N. Fletcher, all of Ridgecrest, Calif.

[73] Assignee: The United States of America as represented by the Secretary of the Navy, Washington, D.C.

[21] Appl. No.: 653,115

[22] Filed: Sep. 21, 1984

[51] Int. Cl.$^3$ ............................................. H01M 6/36
[52] U.S. Cl. ..................................... 429/112; 429/103
[58] Field of Search ................................. 429/112, 103

[56] References Cited

U.S. PATENT DOCUMENTS

| | | | |
|---|---|---|---|
| 3,993,503 | 11/1976 | Ludwig | 429/103 |
| 4,200,686 | 4/1980 | Fletcher | 429/112 |
| 4,221,849 | 9/1980 | Harney | 429/112 |
| 4,234,667 | 11/1980 | Bennion et al. | 429/81 |
| 4,260,667 | 4/1981 | Miles et al. | 429/112 |
| 4,306,004 | 12/1981 | Kaun et al. | 429/112 |
| 4,315,059 | 2/1982 | Raistrick et al. | 429/112 |
| 4,416,958 | 11/1983 | Miles et al. | 429/103 |

Primary Examiner—Charles F. LeFevour
Attorney, Agent, or Firm—Robert F. Beers; W. Thom Skeer; Thomas W. Hennen

[57] ABSTRACT

A thermally activated electrochemical cell utilizes an anode constructed of elemental lithium and transition metal powder. Iron is disclosed to be the best mode of transition metal powder. The cell uses nitrate salt electrolyte containing lithium nitrate and silver nitrate as a cathode enhancer. Electrical performance of this cell includes open circuit potentials of approximately +3.4 volts at 300° C. and thermal activation within the range of 123° to 465° C. Current densities as high as 1,250 mA/cm$^2$ have been demonstrated.

4 Claims, 4 Drawing Figures ial of $-2.8$ volts. Lithium-boron anodes gave anode potentials of about $-3.0$ volts at current densities of over 300 mA/cm$^2$ with a usable temperature range of over 150° C.

HIGH PERFORMANCE MOLTEN NITRATE CELL

BACKGROUND OF THE INVENTION

1. Field of the Invention

This invention pertains to the field of electrochemistry. With more particularity, this invention pertains to thermally activated electrochemical cells. With greatest particularity, this invention pertains to thermally activated electrochemical cells having a composite anode.

2. Description of the Prior Art

Thermally activated electrochemical cells arranged as batteries have been used quite extensively in military applications. Commonly such a battery is used in missiles as a power source. Thermal batteries are selected for this purpose because of their long shelf life and compactness and ability to withstand shock and vibration. Typically these batteries include an electrolyte which under normal storage conditions, is solid and does not conduct electricity. When the battery and/or the electrolyte is heated to a predetermined temperature, as by a built-in pyrotechnic heat source, the electrolyte, upon changing to a molten state, ionically connects the electrodes of the battery to provide the desired electromotive force. Thermal batteries employed in the past and in some present applications in missile systems make use of a lithium chloride-potassium chloride (LiCl-KCl) mixture as the electrolyte, calcium metal as the anode and calcium chromate (CaCrO$_4$) as the cathodic material. The relatively high melting point of the electrolyte limits the activation of the battery to temperatures above 352° C., and thermal batteries using LiCl-KCl mixtures are generally designed to operate at internal temperatures of between 475° and 550° C.

Nitrate salts have been proposed for use in thermal batteries because of their low melting points. For example, see U.S. Pat. No. 4,260,667 hereby incorporated by reference. Potassium nitrate-lithium nitrate (KNO$_3$-LiNO$_3$) mixtures melt at temperatures as low as 123° C. The use of a lower melting point electrolyte can shorten the activation time required for a thermal battery and also reduce the weight of the heat source and insulation required to activate the battery. Also, nitrate salts are low-hazard materials, unlike chromates, which are recognized as health hazards (CaCrO$_4$ has been confirmed as a carcinogen). The high rate discharge of prior nitrate salt-containing battery cells, however, has been limited by both the anode and the cathode.

Composite anodes for use in thermal batteries have been proposed utilizing lithium and a particulate metal such as iron. For example, see U.S. Pat. No. 4,221,849 hereby incorporated by reference. However, the composite lithium-iron anode material prepared as described in U.S. Pat. No. 4,221,849 has generally been used with lithium chloride and potassium chloride as the electrolyte. This electrolyte system does not melt until 352° C. Also, the lithium-iron composite material displays a marked tendency to deflagrate on contact with nitrate melts over 180° C. if the anode lithium content is greater than 10 percent by weight lithium.

The use of silver nitrate (AgNO$_3$) is known to improve cathode performance. For example, see U.S. Pat. No. 4,416,958 hereby incorporated by reference.

Calcium and a lithium-boron alloy have both been previously used as the anode in molten nitrate salt experimental cells. Calcium anodes have suffered from anodic passivation, while having maximum current densities of around 100 mA/cm$^2$ and maximum poten-

SUMMARY OF THE INVENTION

These and other limitations have been overcome by the present invention which combines iron particles with elemental lithium in an anode with nitrate salt electrolytes containing adequate amounts of lithium ions and silver nitrate cathode enhancer in a thermally activated electrochemical cell to produce a thermal battery which combines a relatively low activation temperature with a sustained high current density over the life of the battery. One object of the present invention is to achieve a thermally activated electrochemical cell which becomes activated at a relatively low temperature. Yet another object of the present invention is to achieve cell with high current density and high open circuit potential. Another object of the invention is to provide a lithium-iron composite material for the anode which does not deflagrate on contact with nitrate melts over 180° C. A still further object of the invention is to identify the composition of nitrate melts that are compatible with the lithium-iron anode. These and other objects and advantages of the present invention will be better understood when the invention is studied in conjunction with the following detailed description of the preferred embodiment and accompanying drawing figures.

BRIEF DESCRIPTION OF THE DRAWING

The drawing, divided into four separate figures, illustrates the construction and performance of the present invention, as follows.

DESCRIPTION OF THE PREFERRED EMBODIMENT

Figure 1:
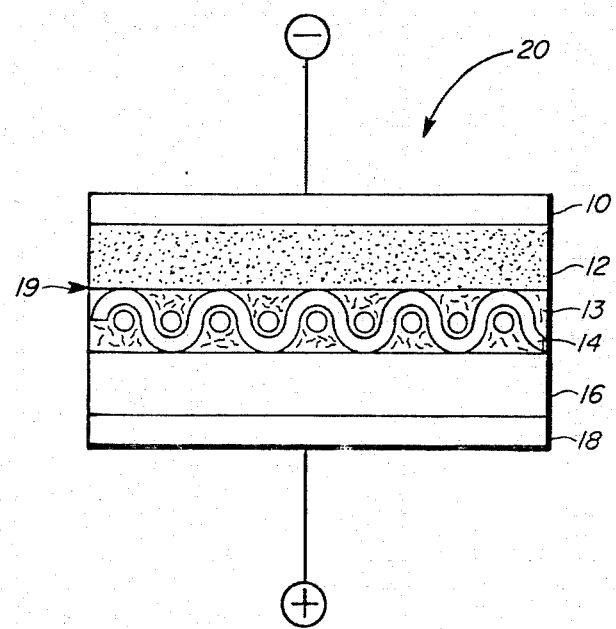
FIG. 1 illustrates the construction and relative orientation of the various components of a thermally activated electrochemical cell.

The general purpose of the present invention is to develop an improved thermal battery using a lithium-iron composite material or alloy as the anode in combination with nitrate salt electrolyte and silver nitrate as a cathode enhancer. The composite anode material consists of small iron particles suspended in elemental lithium. The anode material prepared as described in U.S. Pat. No. 4,221,849 has been found to be incompatible with molten nitrate electrolytes. When the composite is prepared with a more coarse iron powder and heated at 450° C. for 30 to 45 minutes before use, a composite may be prepared capable of either high rate discharge or prolonged open circuit periods in nitrate electrolytes between 120° C. and well over 425° C. When the composite is not heated at 450° C. before use, the lithium-iron composite material displays a marked tendency to deflagrate on contact with nitrate melts above 180° C. if the anode lithium content is over ten percent by weight lithium.

The present invention is concerned chiefly with composite anodes such as lithium-iron where the lithium is supported on an inert, finely divided iron powder suspension. During electrochemical discharge of such anodes, the primary reaction is the discharge of liquid elemental lithium. The iron powder in suspension is highly resistant to any corrosive attack by either the melt or the lithium metal. The iron powders were reagent grade, −325 mesh, and were used as received. Lithium composites were prepared from reagent grade lithium metal ribbon approximately 99.9 percent pure in an inert atmosphere dry box. All lithium preparations were performed in 99.9 percent purity nickel crucibles under argon atmosphere with less than 5 ppm of $H_2O$ and $O_2$. No nitrogen scrubber was used.

All cells were assembled using previously prepared electrolyte wafers consisting of a Gelman glass fiber filter (Type A or AE) that had been immersed in the molten electrolyte. All cells and half-cells used 0.32 $cm^2$ anodes with a stainless steel or nickel backing. The lithium-iron composite anode material was attached to the anode backing by pressing a clean lithium composite surface on acid-etched steel backing surface. Half-cells were of two varieties. The first experimental design was used for study of the anodic process uninfluenced by anode binder reactions. The anode was discharged in a crucible (either porcelain or platinum) with approximately 30 ml of electrolyte. This form of half-cell was restricted to the potentiostatic discharges. Galvanostatic discharges were performed in a conventional manner as is described generally in the literature.

All salts used were reagent grade. Silver nitrate ($AgNO_3$) was ground but otherwise used as received. The lithium nitrate ($LiNO_3$), potassium nitrate ($KNO_3$) and sodium nitrate ($NaNO_3$) salts were dried under vacuum at 120°–130° C. for several days prior to use.

The lithium-iron composite or alloy for the anodic material was prepared by the following procedure. In a nickel crucible reagent grade, −325 mesh, iron powder was heated in a dry box under an argon atmosphere to 450°–500° C. Lithium metal was added slowly with stirring. Continual stirring (with a stainless steel or nickel spatula) allowed the mixture to become more homogenous. A layer of lithium was found to generally cover the interior of the crucible which allowed for easy removal of the lithium-iron composite. Mixtures of from 10 to 25 percent by weight lithium have been tested. However, consistent cell performance was obtained with anodes that were ten weight percent lithium. Anode lithium percentage may vary over a range of from approximately five weight percent to as much as fifteen weight percent or higher. Lithium percentages greater than ten percent tend to exhibit anode instability, while percentages below ten percent lose the energy density of lithium and have proportionately shorter lifetimes. Thus about 10 weight percent lithium appears optimum.

Referring now to the drawing figures and particularly to FIG. 1, it is seen that cell 20 is constructed in layers. Anode backing 10 defines the negative side of cell 20. Anode backing 10 may be constructed of nickel, stainless steel, copper, iron or similar metals in the present invention. Contacting anode backing 10 is anode 12 which is constructed of lithium and a transition metal powder. Although iron has been shown to produce the highest performance, other transition metal powders such as nickel, cobalt, or copper could be used. Contacting anode 12 is electrolyte 13 which may be lithium nitrate but not potassium nitrate, or sodium nitrate. However, a mixture of two or more of these nitrate salts may be used as long as sufficient lithium nitrate is present. The reason for mixing potassium nitrate or sodium nitrate with lithium nitrate electrolyte is to lower the electrolyte melting point, not to improve electrical efficiency. In experimental cells, best performance has been obtained using at least 50 weight percent lithium nitrate in the electrolyte. It is believed that a passivating film 19 forms on the boundary between electrolyte 13 and anode 12. This film 19 is believed to render the anode stable in nitrate melts. In order for film 19 to form, sufficient lithium ions are necessary in electrolyte 13.

Electrolyte 13 is absorbed in fiber glass separator 14 which is a Gelman glass fiber filter (Type A or AE) that had been immersed in the molten electrolyte. Contacting electrolyte 13 and fiber lass separator 14 is cathode enhancer 16. It has been found that silver nitrate is very advantageous in enhancing the performance of the cathode. Cathode current collector 18 contacts cathode enhancer 16 and completes the construction of cell 20. Cathode current collector 18 may be constructed of nickel, platinum, silver, iron, copper, stainless steel, or similar metals. Cathode current collector 18 defines the positive side of cell 20.

The use of a lithium-iron composite material or alloy as the anode, with lithium nitrate as the electrolyte has yielded a cell with current densities of up to 1,250 $mA/cm^2$ and an open circuit potential of 3.4 volts. This has been obtained in a system with an operable temperature range of over 200° C. (240°–465° C.). No degradation was observed over that range. In one test with silver nitrate as a catholyte or cathode enhancer, a current density of 860 $mA/cm^2$ at two volts for seven minutes at 300° C. was obtained.

This system affords current densities two to four times greater than any previous nitrate salt system. Additionally, the cell potential is very near to that for elemental lithium. In comparing this cell to the commonly used $Ca/CaCrO_4$ system, the lithium-iron anode with nitrate salts gives current densities ten to twelve times greater and a cell voltage about half a volt higher.

Figure 2:
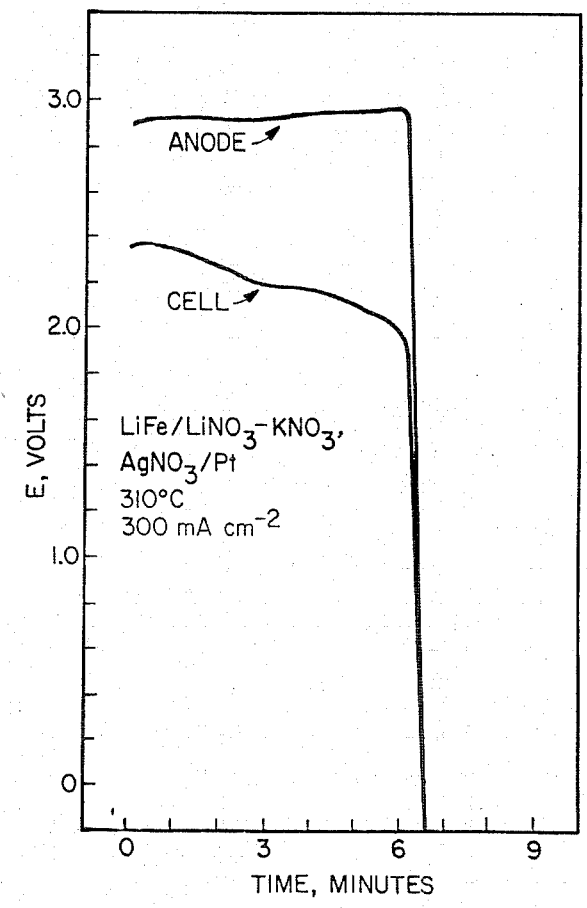
FIG. 2 illustrates the galvanostatic discharge of a thermal battery cell according to the present invention.
Figure 3:
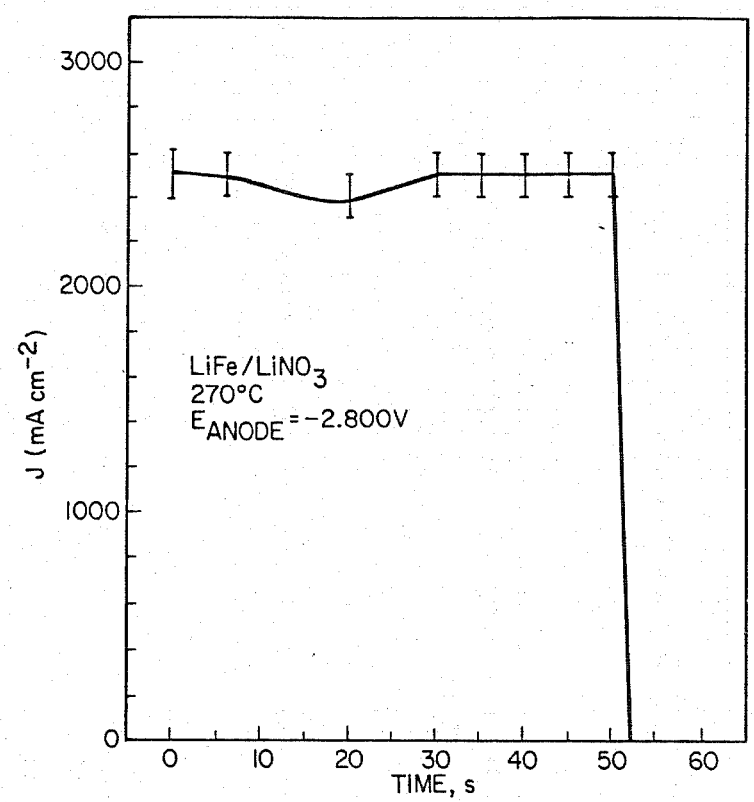
FIG. 3 illustrates the potentiostatic discharge of a lithium-iron anode in molten lithium nitrate.

FIG. 2 illustrates the galvanostatic discharge of a lithium-iron composite anode of roughly nine weight percent lithium in an electrolyte mixture of lithium nitrate and potassium nitrate. It was desirable to determine the optimum discharge rate capability of the lithium-iron composite anode material. Consequently, this material was discharged potentiostatically at several different potentials. A typical potentiostatic discharge is shown in FIG. 3 for a discharge at −2.80 volts vs. the $AgNO_3/Ag$ reference. In each case, the electrolyte was a mixture of lithium nitrate and potassium nitrate eutectic and anode lithium content was approximately nine weight percent lithium. During the discharge of the lithium iron composite anodes, it was observed that the anodes typically discharged to exhaustion of the lithium. In several cases with minimal open circuit time, the coulombic efficiency approached unity.

The observed anode potential in actual cells is significantly more negative than that of the potentiostatic case during discharge. In addition, where silicon dioxide ($SiO_2$) is used with the electrolyte as a binder, significant and severe degradation of the silicon dioxide binder is noted in the region of the edges of the anode. This is attributed to the pyrometallurgical reduction of the silicon dioxide to silicon.

Figure 4:
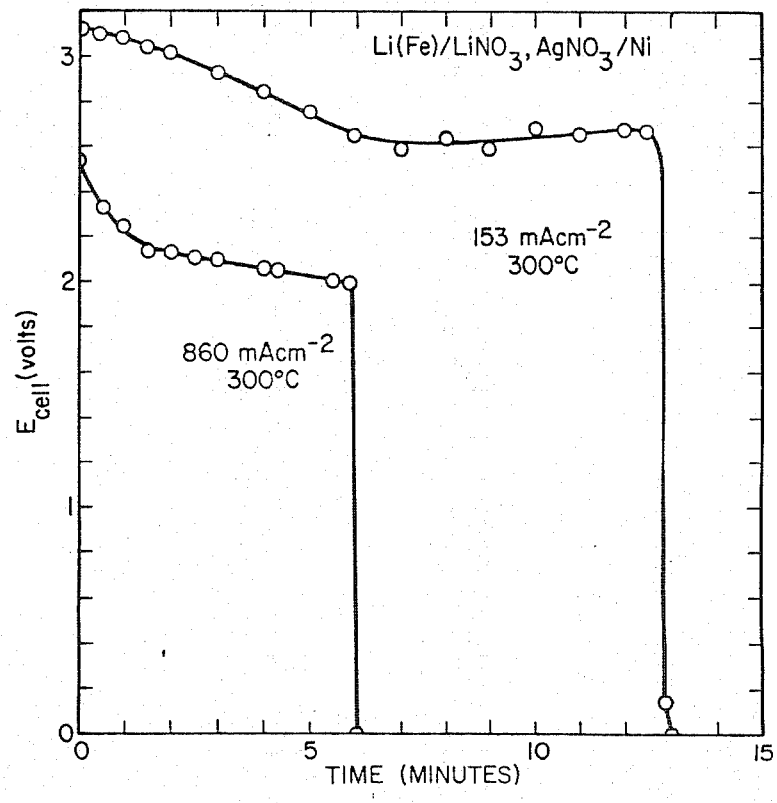
FIG. 4 illustrates the galvanostatic discharge of a lithium-iron/molten nitrate thermal battery cell.

The discharge of cells using the Gelman glass fiber filter binder reflects this parasitic reaction in its lower cell potential and in the higher anodic over potential. FIG. 4 shows the galvanostatic discharge of several cells constructed with the cathode adjacent to the anode. A great excess of silver nitrate was present near the cathode.

In more particular detail, FIG. 3 illustrates the potentiostatic discharge of a lithium-iron anode in molten lithium nitrate at 270° C. and −2.800 volts vs. Ag+/Ag. The counter electrode was a massive platinum foil. Also, FIG. 4 illustrates galvanostatic discharge of lithium-iron/molten nitrate thermal battery cells at varying current densities in 300° C. lithium nitrate. Silver nitrate was isolated in the catholyte and present in great excess.

As shown by the foregoing detailed description of the preferred embodiment and the performance of the present invention as illustrated in the drawing figures, it is seen that the present invention provides a remarkable and surprising increase in thermal battery cell performance. Obviously many modifications and variations of the present invention are possible in light of the above teachings. It is therefore to be understood that within the scope of the appended claims the invention may be practiced other than as specifically described.

What is claimed is:

1. A thermally activated electrochemical cell including:
   an anode backing composed of a metal selected from the group consisting of nickel, stainless steel, copper and iron;
   an anode composed of lithium and a transition metal selected from the group consisting of iron, nickel, cobalt, and copper, in contact with said anode backing;
   an electrolyte composed of lithium nitrate and at least one nitrate salt selected from the group consisting of potassium nitrate and sodium nitrate, in contact with said anode;
   a silver nitrate cathode enhancer contacting said electrolyte; and
   a cathode current collector composed of a metal selected from the group consisting of platinum, nickel, silver, iron, copper, and enhancer.

2. A thermally activated electrochemical cell as set forth in claim 1 wherein said anode consists of from 5 to 15 weight percent lithium and from 85 to 95 weight percent iron.

3. A thermally activated electrochemical cell as set forth in claim 2 wherein said iron in said anode is present as reagent grade fine particles.

4. A thermally activated electrochemical cell as set forth in claim 1 wherein said cell further comprises a glass fiber separator disposed between said anode and said cathode enhancer and having said electrolyte absorbed therein.

* * * * *